Patented Sept. 28, 1948

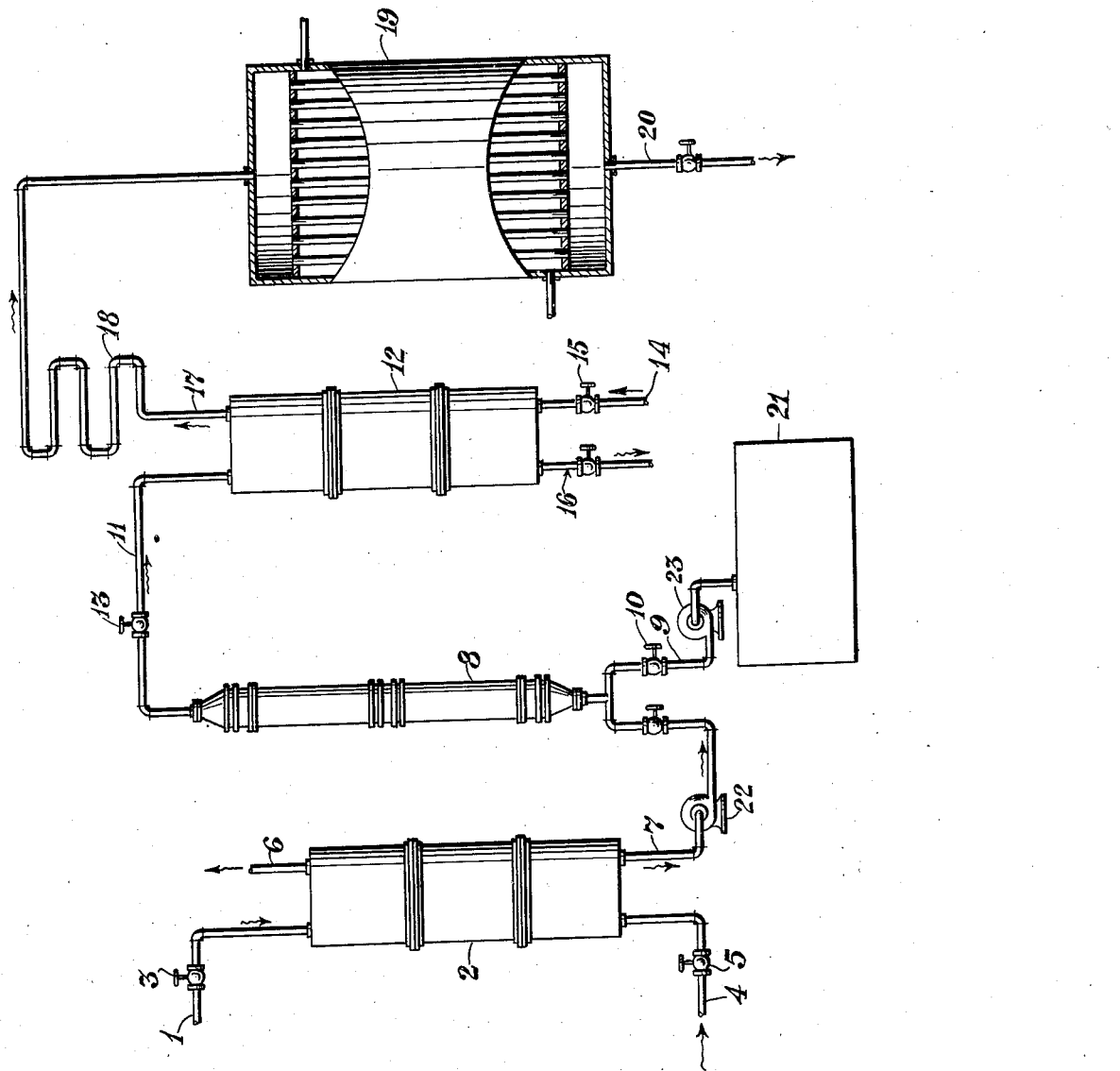

2,450,105

UNITED STATES PATENT OFFICE 2,450,105

PROCESS FOR OBTAINING NITROGEN TETROXIDE

George Washington Batchelder, Mantua, and Albert W. Hawkins, Woodbury, N. J., assignors to E. I. du Pont de Nemours & Company, Wilmington, Del., a corporation of Delaware Application February 13, 1943, Serial No. 475,724

11 Claims. (Cl. 23—159)

1

This invention is directed to a process and apparatus for the manufacture of nitrogen tetroxide ($NO_2$) and in particular to the production of $NO_2$ from the oxides of nitrogen or from one or more substances containing at least one of said oxides.

Nitrogen tetroxide is of commercial importance because of its properties and various uses. It serves well as an oxidizing, nitrating, bleaching and diazotizing agent and is often used as an intermediate product.

Several processes have been advanced for the production of $NO_2$ but they have not fully solved the problems involved. The primary drawback has been the high cost of production and the impurity of the final material, or either of these. Methods of the prior art for producing $NO_2$ include treating gaseous mixtures of nitrogen and oxygen in electric furnaces, burning carbon monoxide under pressure in the presence of oxygen and nitrogen, exploding a compressed mixture of oxygen and nitrogen, subjecting a mixture of air and NO to vigorous agitation at a low temperature, passing a mixture of hydrocyanic acid and air at 600° C. in contact with a catalyst, decomposing nitric acid by heating and rapidly cooling the mixture of evolved gases, and other procedures.

An object of the present invention is to provide a new and improved process and apparatus for manufacturing nitrogen tetroxide. Another object is a process for producing substantially pure $NO_2$. A further object is a process for producing $NO_2$ comprising oxidizing ammonia with oxygen, air or other oxygen-bearing gases in the presence of a heated catalyst, concentrating the $NO_2$ by means of sulfuric acid and recovering the $NO_2$ therefrom. An additional object is such a process characterized by its economy and efficiency. These and still further objects and advantages of our invention will be apparent upon a perusal of this specification.

In carrying out our invention, in general, oxides of nitrogen obtained from the ammonia oxidation or other suitable process are absorbed in an excess of concentrated sulfuric acid, resulting in a mixture comprising essentially nitrosyl sulphuric acid, to which dilute nitric acid is added. The resulting mixture is preheated to between about 85 and 110° C. and introduced into a stripping tower from which $NO_2$ is evolved and condensed. The residual sulfuric acid is exited from the base of said tower. A more detailed disclosure of our invention is made hereinbelow.

According to the preferred embodiment of the present invention, about 70 to 95% strength sulfuric acid is introduced into the upper region of an absorption tower countercurrent to approximately an equimolar mixture of NO and $NO_2$ entering the lower portion of the tower. However, the concentration of the sulfuric acid may be varied widely depending upon the use to be made of the $NO_2$. For example, if it is desired to use the $NO_2$ for certain purposes, as low as 50 to 60% sulfuric may be employed. The mixture obtained thereby is passed into a preheater to which nitric acid of about 30 to 60% strength is added. The resulting mixture, maintained between approximately 85 and 110° C., is introduced into a stripping or denitrating tower countercurrent to steam conveyed into said tower near the base thereof. The temperature of the stripping tower is maintained between about 90 and 115° C. In addition to nitric acid and water vapors, NO and $NO_2$ are evolved. Nitric acid vapors pass out the top of said tower into a preliminary condenser, and the condensate refluxes into the tower countercurrent to NO and oxidizes it to $NO_2$. The denitrated or residual sulfuric acid is withdrawn from the bottom of the stripping tower. Nitrogen tetroxide passes through the preliminary condenser into a total condenser and is liquefied. Up to 99% or higher $NO_2$ is obtained by this process.

In all instances herein where a tower is referred to, it is to be construed as being adequately provided with packing material or fractionating plates. These towers may be of any type absorption, stripping, denitrating or distilling tower or other satisfactory apparatus which will accomplish the desired result, and may be constructed either of acid-resistant iron, chemicalware or any like material which will serve the purpose.

In order to disclose our invention further and to point out the particulars thereof, reference is made to the accompanying diagrammatic representation which, however, is to be regarded only as a desirable way of carrying out said invention and is not to be taken as a limitation thereon. Referring to the drawing, sulfuric acid of from 70 to 95% strength is introduced through line 1 into an absorption tower 2, the rate of flow being controlled by valve 3. This acid flows down the tower countercurrent to approximately an equimolar mixture of NO and $NO_2$ entering through conduit 4, the rate of passage being regulated by valve 5. Said tower is vented at 6 to allow the escape of waste gases. Preferably the temperature of the absorbent (sulfuric acid) is maintained between 20 and 30° C., since a departure from this temperature range tends to lower the absorption. The resulting liquid, containing a mixture of nitric and nitrosyl sulfuric acid in sulfuric acid, is passed from the bottom of the absorption tower through line 7 into the base of a preheater 8. Although this preheater, as shown, is steam-jacketed other heating means may be used. The preheater may be packed a portion of its length to serve also as a mixer. Nitric acid having a strength from 30 to 60% is introduced from storage tank 21 into the bottom of the preheater through line 9, the rate of flow being regulated by valve 10. The rate of flow desired depends on the amount required to maintain approximately an equimolar ratio of nitric to nitrosyl sulfuric acid. The mixture of acids is preheated to between about 85 and 100° C. and passed through line 11 into a stripping or denitrating tower 12, the rate of flow being controlled by valve 13. This mixture flows down said tower countercurrent to steam introduced through line 14 at the bottom thereof, the rate of flow of the latter being regulated by means of valve 15. The temperature of the denitrating tower is maintained between about 90 and 115° C. Denitrated sulfuric acid is exited through line 16 at the bottom of the tower. NO, NO₂, nitric acid vapors and water vapors evolve from the mixture and pass out of the tower through conduit 17. Nitric acid vapors liquefy in the preliminary condenser 18 and reflux into the tower countercurrent to NO and oxidize it to NO₂. NO₂ vapors pass through condenser 18 and into a total condenser 19 in which they are liquefied. Pumps 22 and 23 serve to convey the materials through the system. Liquid NO₂ up to 99% purity or better is withdrawn from outlet 20.

One of the reactions which takes place in the absorption tower may be represented by the following equation.

(1) $NO + NO_2 + 2H_2SO_4 = 2HNOSO_4 + H_2O$

Usually some nitric acid is formed in reaction (1), since NO₂ and sulfuric acid react to form nitric and nitrosyl sulfuric acid. From this equation it can be seen why an equimolar ratio of NO to NO₂ is preferred. The resulting mixture is butted with nitric acid to produce approximately an equimolar ratio of nitric to nitrosyl sulfuric acid.

The following equation indicates a reaction which occurs in the denitrating or stripping tower.

(2) $HNOSO_4 + HNO_3 = H_2SO_4 + 2NO_2$

Likewise from Equation 2 it may be seen why an equimolar ratio of nitric to nitrosyl sulfuric acid is preferred. There are several, although not readily apparent, advantages of using nitric acid in our process. It is known that nitrosyl sulfuric acid is extremely stable in the presence of concentrated sulfuric acid. Such a mixture may be heated to its boiling point without any considerable decomposition of the nitrosyl sulfuric acid. However, we have found that the decomposition of nitrosyl sulfuric acid in sulfuric acid is greatly facilitated by the presence of 30 to 60% strength nitric acid, the ratio of nitric to nitrosyl sulfuric being approximately one. Other than diluting the absorbent, nitric acid itself supplies additional NO₂.

Lower oxides of nitrogen, for example NO or N₂O₃, may form during the denitration according to the following equations.

(3) $3NO_2 + H_2O = 2HNO_3 + NO$ (4) $2HNOSO_4 + H_2O = 2H_2SO_4 + N_2O_3$

However, these are immediately oxidized to NO₂ by the refluxing nitric acid. This acid passes back into the mixture in the tower and aids in further decomposing nitrosyl sulfuric acid.

From the foregoing particularistic description of our invention, variations may be suggested to those skilled in the art; however, these and many other modifications are included within the language of the appended claims. That is, changes may be made in the strengths and relative proportions of compositions, in the conditions of reactions, and in the form, construction and arrangement of the parts herein without departing from the scope of the invention and without sacrificing its advantages. Although the drawing pertains to a continuous process, the invention may be practiced by processing batches. Thus the preheater is not essential, since nitric acid may be mixed with the material from the absorption tower and the resulting mixture brought to the desired temperature after introducing the same into the stripping tower. Detailed disclosure and a discussion of the theories or principles, including reactions, underlying our invention are for the purpose of clarity only and are not to be construed as a definition of the scope of said invention, reference being had for this purpose to the following claims.

We claim.

1. A process for obtaining nitrogen tetroxide in relatively pure form which comprises absorbing nitrogen oxides in strong sulfuric acid, introducing nitric acid into the resulting mixture, distilling the mixture, condensing and refluxing the nitric acid and water vapors, causing said nitric acid to react with and oxidize the NO present to NO₂ and simultaneously itself to become reduced to NO₂, evolving and subsequently condensing the nitrogen tetroxide, and separating it as a liquefied product.

2. In the method of obtaining nitrogen tetroxide in relatively pure form the steps which comprise absorbing nitrogen oxides in sulfuric acid of between approximately 70 and 95% strength, introducing nitric acid of between approximately 30 and 60% strength into the mixture so obtained at a temperature between about 90 and 115° C., distilling the mixture, condensing and refluxing the nitric acid and water vapors, causing said nitric acid to react with and oxidize the NO present to nitrogen tetroxide while simultaneously becoming reduced itself to nitrogen tetroxide, evolving and subsequently condensing the nitrogen tetroxide, and separating it as a liquefied product.

3. A process for obtaining nitrogen tetroxide in relatively pure form which comprises introducing nitrogen oxide bearing gases into an absorption tower countercurrent to sulfuric acid, passing nitric acid into the resulting mixture, introducing the mixture thus formed into a denitrating tower passing a heating fluid countercurrent thereto in direct heat exchange therewith, evolving nitrogen oxides, nitric acid and water vapors, condensing and refluxing nitric acid and water vapors into said tower, causing said nitric acid to react with and oxidize the NO present to nitrogen tetroxide while simultaneously becoming reduced itself to nitrogen tetroxide, passing the evolved nitrogen tetroxide into a condenser, and liquefying and separating the same.

4. A process for obtaining nitrogen tetroxide in relatively pure form which comprises introducing nitrogen oxide bearing gases into an absorption tower countercurrent to sulfuric acid, introducing the resulting mixture into a preheater, passing nitric acid into said preheater, introducing the mixture thus formed into a denitrating tower passing a heating fluid countercurrent thereto in direct heat exchange therewith, evolving nitrogen oxides, nitric acid and water vapors, condensing and refluxing nitric acid and water vapors into said denitrating tower, causing said nitric acid to react with and oxide the NO present to nitrogen tetroxide while simultaneously becoming reduced itself to nitrogen tetroxide, passing nitrogen tetroxide into a condenser, and liquefying and separating the same.

5. In the process of obtaining nitrogen tetroxide in relatively pure form, the method of concentrating said compound which comprises bringing nitrogen oxides into contact with strong sulfuric acid, introducing the resulting mixture into a preheater, passing relatively weak nitric acid into said preheater, introducing the mixture obtained into a denitrating tower passing steam countercurrent thereto and in direct heat exchange therewith, condensing and refluxing the evolved nitric acid and water vapors into said tower causing said nitric acid to react with and oxidize the NO present to nitrogen tetroxide while simultaneously becoming reduced itself to nitrogen tetroxide, passing the evolved gaseous nitrogen tetroxide into a condenser, and liquefying and separating the same.

6. The method for obtaining nitrogen tetroxide in relatively pure form which includes absorbing nitrogen oxides in between about 70 and 95% strength sulfuric acid, introducing between about 30 and 60% strength nitric acid into the resulting mixture, passing the mixture thus obtained into a denitrating tower passing a heating fluid countercurrent thereto and in direct heat exchange therewith, evolving nitrogen oxides, nitric acid and water vapors, condensing and refluxing nitric acid and water vapors into said tower, causing said nitric acid to react with and oxidize the NO present to nitrogen tetroxide while simultaneously becoming reduced itself to nitrogen tetroxide, passing the nitrogen tetroxide into a condenser, and liquefying and separating the same.

7. A process of obtaining nitrogen tetroxide in relatively pure form which comprises absorbing nitrogen oxides in sulfuric acid, maintaining said acid at a temperature between about 20 and 30° C., introducing the resulting mixture into a preheater, maintaining said preheater at a temperature between about 85 and 110° C., passing nitric acid into said preheater, introducing the mixture thus obtained into a denitrating tower passing steam countercurrent to the mixture and in direct heat exchange therewith, maintaining the temperature of said tower between about 90 and 115° C., condensing and refluxing the evolved nitric acid and water vapors into said tower causing said nitric acid to react with and oxidize the NO present to nitrogen tetroxide while simultaneously becoming reduced itself to nitrogen tetroxide, condensing the evolved nitrogen tetroxide, and liquefying and separating the same.

8. The method for obtaining nitrogen tetroxide in relatively pure form which comprises bringing nitrogen oxides into contact with sulfuric acid of between approximately 70 and 95% strength, introducing the resulting mixture into a preheater, passing nitric acid of between approximately 30 and 60% strength into said preheater, introducing the mixture thereby formed into a denitrating tower passing steam countercurrent to the aforesaid mixture and in direct heat exchange therewith, condensing and refluxing the evolved nitric acid and water vapors into said tower causing said nitric acid to react with and oxidize the NO present to nitrogen tetroxide while simultaneously becoming reduced itself to nitrogen tetroxide, subsequently condensing the evolved nitrogen tetroxide and liquefying and separating the same.

9. A process for obtaining nitrogen tetroxide in relatively pure form including absorbing a mixture of at least two nitrogen oxides in sulfuric acid of between approximately 70 and 95% strength, maintaining said acid at a temperature between about 20 and 30° C., introducing the resulting mixture into a preheater, maintaining said preheater at a temperature between about 85 and 110° C., passing nitric acid of between approximately 30 and 60% strength into said preheater, introducing the mixture thus obtained into a denitrating tower passing steam countercurrent thereto and in direct heat exchange therewith, maintaining the temperature of said tower between about 90 and 115° C., condensing and refluxing the evolved nitric acid and water vapors into said tower causing said nitric acid to react with and oxidize to nitrogen tetroxide the lower nitrogen oxide while simultaneously becoming reduced itself to nitrogen tetroxide, liquefying and recovering the liberated nitrogen tetroxide.

10. The process of claim 9 in which the mixture of nitrogen oxides comprises NO and $NO_2$.

11. A continuous process for obtaining substantially pure nitrogen tetroxide which comprises introducing a substantially equimolar mixture of NO and $NO_2$ into an absorption tower counter-current to sulfuric acid of between approximately 70 and 95% strength maintained at a temperature between about 20 and 30° C., passing the resulting mixture into a steam-jacketed preheater maintained at a temperature between about 85 and 110° C., introducing a sufficient amount of nitric acid of between approximately 30 and 60% strength into said preheater to maintain a molar ratio of nitric to nitrosyl sulfuric acid of substantially one, passing the mixture thereby obtained into a denitrating tower passing steam countercurrent thereto and in direct heat exchange therewith, while maintaining the temperature of said tower between about 90 and 115° C. whereby a gaseous mixture of nitric acid vapors, water vapor, NO and $NO_2$ is evolved, condensing and refluxing the evolved nitric acid and water vapors into said tower countercurrent to the evolved NO whereby said NO is oxidized to $NO_2$ and subsequently liquefying and separating nitrogen tetroxide.

GEORGE WASHINGTON BATCHELDER.
ALBERT W. HAWKINS.

REFERENCES CITED

The following references are of record in the file of this patent:

UNITED STATES PATENTS

| Number | Name | Date |
|---|---|---|
| 1,197,295 | Jensen | Sept. 5, 1916 |
| 1,236,662 | Berkeland | Aug. 14, 1917 |
| 1,324,255 | Jensen | Dec. 9, 1919 |
| 1,590,043 | Lentz | June 22, 1926 |
| 1,740,549 | McKee | Dec. 24, 1929 |
| 1,755,768 | Busching | Apr. 22, 1930 |
| 1,989,267 | Caro | Jan. 29, 1935 |
| 2,169,826 | Wendlandt | Aug. 15, 1939 |

FOREIGN PATENTS

| Number | Country | Date |
|---|---|---|
| 237,937 | Great Britain | Aug. 11, 1925 |
| 292,951 | Great Britain | Oct. 15, 1929 |

Certificate of Correction

Patent No. 2,450,105. September 28, 1948.

GEORGE WASHINGTON BATCHELDER ET AL.

It is hereby certified that errors appear in the printed specification of the above numbered patent requiring correction as follows:

Column 4, line 60, claim 3, for "direst" read *direct*; column 5, line 6, claim 4, for the word "oxide" read *oxidize*; line 17, claim 5, after "mixture" insert *thereby*; and that the said Letters Patent should be read with these corrections therein that the same may conform to the record of the case in the Patent Office.

Signed and sealed this 21st day of December, A. D. 1948.

[SEAL]

THOMAS F. MURPHY,
*Assistant Commissioner of Patents.*